United States Patent
Schmidt

(10) Patent No.: US 9,987,934 B2
(45) Date of Patent: Jun. 5, 2018

(54) ELECTRIC POWER SYSTEM FOR ONE OR MORE ELECTRIC CRANES

(71) Applicant: Mi-Jack Products, Inc., Hazel Crest, IL (US)

(72) Inventor: Harvey E. Schmidt, Flossmoor, IL (US)

(73) Assignee: MI-JACK PRODUCTS, INC., Hazel Crest, IL (US)

( * ) Notice: Subject to any disclaimer, the term of this patent is extended or adjusted under 35 U.S.C. 154(b) by 334 days.

(21) Appl. No.: 14/680,681

(22) Filed: Apr. 7, 2015

(65) Prior Publication Data

US 2016/0297308 A1 Oct. 13, 2016

(51) Int. Cl.
| | |
|---|---|
| B60L 1/00 | (2006.01) |
| B60L 11/18 | (2006.01) |
| H02J 1/14 | (2006.01) |
| H02J 7/02 | (2016.01) |
| H02J 7/34 | (2006.01) |
| H02J 7/14 | (2006.01) |
| H02M 1/00 | (2006.01) |

(52) U.S. Cl.
CPC ............ *B60L 11/1811* (2013.01); *H02J 1/14* (2013.01); *H02J 7/02* (2013.01); *H02J 7/14* (2013.01); *H02J 7/34* (2013.01); *H02M 2001/008* (2013.01)

(58) Field of Classification Search
CPC ..................................... H02J 7/14; H02J 7/02
USPC ........................................................ 307/9, 9.1
See application file for complete search history.

(56) References Cited

U.S. PATENT DOCUMENTS

| | | | |
|---|---|---|---|
| 5,936,375 A | 8/1999 | Masamitsu | |
| 6,522,955 B1 * | 2/2003 | Colborn | H02J 3/005 307/10.1 |
| 7,155,912 B2 | 1/2007 | Enis et al. | |
| 7,165,654 B2 | 1/2007 | Ichimura et al. | |
| 7,783,390 B2 | 8/2010 | Miller | |
| 8,061,495 B2 | 11/2011 | Ichimura et al. | |
| 8,174,225 B2 | 5/2012 | Mazumdar et al. | |
| 2005/0173198 A1 * | 8/2005 | Takehara | B66B 1/30 187/277 |
| 2009/0127048 A1 | 5/2009 | Ichimura et al. | |
| 2011/0220447 A1 | 9/2011 | Dufke et al. | |

(Continued)

FOREIGN PATENT DOCUMENTS

| | | |
|---|---|---|
| CA | 2640993 | 12/2008 |
| CN | 101065309 | 8/2011 |
| CN | 102239105 | 11/2011 |

(Continued)

OTHER PUBLICATIONS

Infringement Search Report conducted dated Oct. 12, 2012.

*Primary Examiner* — Rexford Barnie
*Assistant Examiner* — Dru Parries
(74) *Attorney, Agent, or Firm* — McCracken & Gillen LLC

(57) ABSTRACT

According to one aspect, an electric power system includes an energy storage device having a first peak power rating and an energy transfer circuit operable to provide electric grid energy to the energy storage device. The energy transfer circuit is further operable to cause electric energy to be supplied from the energy storage device to at least one electric crane having a second peak power rating no greater than the first peak power rating throughout an entire operational load range.

22 Claims, 4 Drawing Sheets

(56) References Cited

U.S. PATENT DOCUMENTS

2012/0160796 A1\* 6/2012 Weckbecker ........... B66C 13/28
                                                                                                      212/284

FOREIGN PATENT DOCUMENTS

| | | |
|---|---|---|
| CN | 102311046 | 1/2012 |
| DE | 4008370 | 9/1991 |
| DE | 102008057765 | 5/2010 |
| DE | 102010063911 | 6/2012 |
| EP | 1716066 | 11/2006 |
| EP | 2170756 | 4/2010 |
| EP | 2345619 A1 \* | 7/2011 |
| EP | 2349904 | 8/2011 |
| HK | 1107076 | 3/2008 |
| IT | MI910633 | 3/1991 |
| IT | 1245186 | 9/1994 |
| JP | H11217193 | 8/1999 |
| JP | 2007537110 | 12/2007 |
| JP | 2010531286 | 9/2010 |
| JP | 2011063374 | 3/2011 |
| JP | 2011167042 | 8/2011 |
| JP | 2012056684 | 3/2012 |
| JP | 2012508678 | 4/2012 |
| KR | 20070007052 | 1/2007 |
| SG | 177245 | 2/2012 |
| TW | 201202072 | 1/2012 |
| WO | WO05076989 | 8/2005 |
| WO | WO09002509 | 12/2008 |
| WO | WO10054852 | 5/2010 |
| WO | WO11034130 | 3/2011 |
| WO | WO11099212 | 8/2011 |
| WO | WO12000210 | 1/2012 |
| WO | WO12084508 | 6/2012 |

\* cited by examiner

ELECTRIC POWER SYSTEM FOR ONE OR MORE ELECTRIC CRANES

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF THE DISCLOSURE

The present inventive subject matter relates to power supplies for lifting devices, and more particularly, to an electric power system for one or more electric cranes.

BACKGROUND

Facilities utilizing electric cranes (e.g., ports (ocean and inland), rail yards, industrial facilities) can experience problems relating to the grid power required to operate the cranes. In some locations there are limits on the available power that can be drawn from the grid due to the local energy infrastructure. This limitation of available grid power can hinder expansion of the business operation or upgrades to other equipment. Other locations that have the infrastructure to supply enough grid power to handle peak equipment loads charge a premium when this power demand is used resulting in higher facility operating costs.

Electric cranes can develop regenerative energy due to operations such as lowering a load or slowing down crane functions. The typical electric crane has resistors for the purpose of dissipating this energy as there is no energy storage system on the crane and the typical grid utility does not allow the energy to be returned. The regenerative energy is wasted in the resistors, and this is accepted as such power dissipation prevents damage to the controls due to excessive voltage and heat that would otherwise be created by the regenerative energy. There are devices that attempt to transfer this energy from crane to crane, but this strategy is dependent on the availability of the energy from one crane and the need for energy from another crane.

SUMMARY

According to one aspect, an electric power system includes an energy storage device having a first peak power rating and an energy transfer circuit operable to provide electric grid energy to the energy storage device. The energy transfer circuit is further operable to cause the energy storage device to supply an entire electric demand to at least one electric crane having a second peak power rating no greater than the first peak power rating.

According to another aspect, an electric power system for an electric crane comprises an energy storage device having a first peak power rating wherein the electric crane has a second peak power rating less than the first peak power rating and is capable of developing regenerative energy. An energy transfer circuit provides electric grid energy and the regenerative energy to the energy storage device to charge the energy storage element and further provides operating power for the electric crane throughout an entire operational range of the electric crane.

According to yet another aspect, an electric power system for a plurality of electric cranes includes an energy storage device having a first peak power rating wherein the plurality of electric cranes has a combined second peak power rating less than the first peak power rating and wherein each electric crane is capable of developing regenerative energy. An energy transfer circuit provides electric grid energy and the regenerative energy to the energy storage device to charge the energy storage element and further provides operating power for the plurality of electric cranes throughout an entire operational range of each electric crane.

Other aspects and advantages of the present invention will become apparent upon consideration of the following detailed description and the attached drawings wherein like numerals designate like structures throughout the specification.

DETAILED DESCRIPTION

Figure 1:
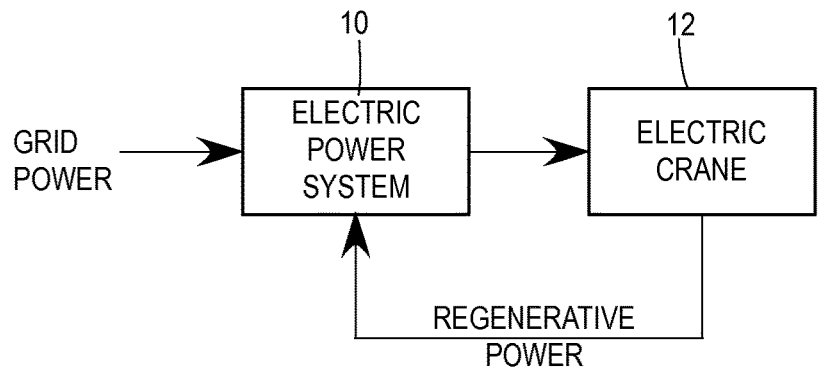
FIG. 1 is a simplified block diagram of an embodiment of an electric power system in conjunction with an electric crane.
Figure 2:
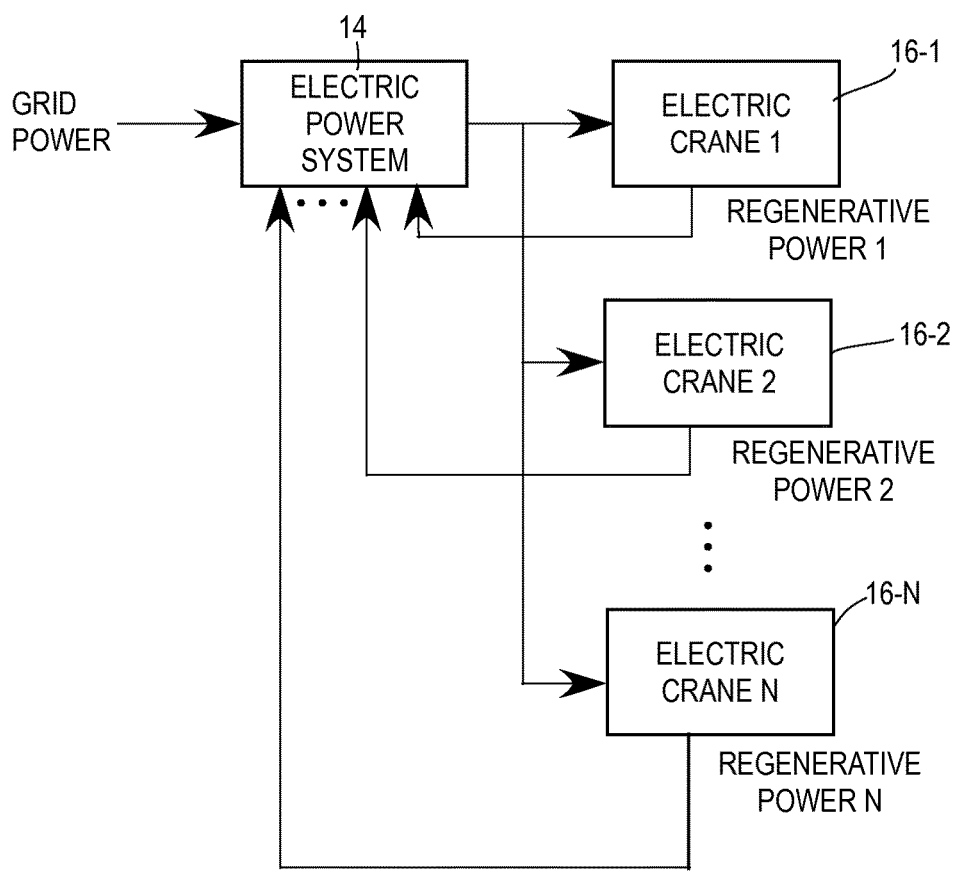
FIG. 2 is a simplified block diagram of a further embodiment of an electric power system in conjunction with a plurality of electric cranes.

Referring to FIG. 1, an electric power system 10 according to the present invention solves the various problems stated above. A system 10 can be installed on each of one or more individual cranes 12. Alternatively, as seen in FIG. 2, an electric power system 14 can be centralized and distribute electric power to a plurality of cranes 16-1, 16-2, ..., 16-N, for example, from a central enclosure. The electric power system 10 or 14 includes an energy storage device (e.g., one or more batteries, one or more capacitor system(s), one or more flywheels, or one or more other energy storage devices and/or combinations thereof, such as a combined battery (or batteries) and capacitor system) having the ability to provide and store energy, as well as the connection, control and environmental equipment required for efficient and safe operation. Preferably, the energy storage device has a first peak power rating, and the crane(s) have a second total peak power rating no greater than the first peak power rating. Also preferably, the energy storage device supplies the total electric demand for the crane(s) operated thereby. The energy storage device for multiple cranes 16 on the same grid is proportionately larger to be able to handle the larger energy requirements. The electric power system 10 or 14 with the energy storage device solves many of the grid problems that electric crane facilities encounter. When the energy storage device is less than fully charged the system 10 or 14 absorbs the regenerative energy that is created and stores it for future use. Because the energy storage device provides the total energy demands of the crane(s) the expensive charges for peak power are reduced and maximum grid limits are prevented from being reached. The system 10 or 14 is charged at a low and consistent charging power from the grid and regenerative energy thereby keeping grid demand lower and more consistent. This results in a reduction of emissions at the grid generating source.

Figure 3:
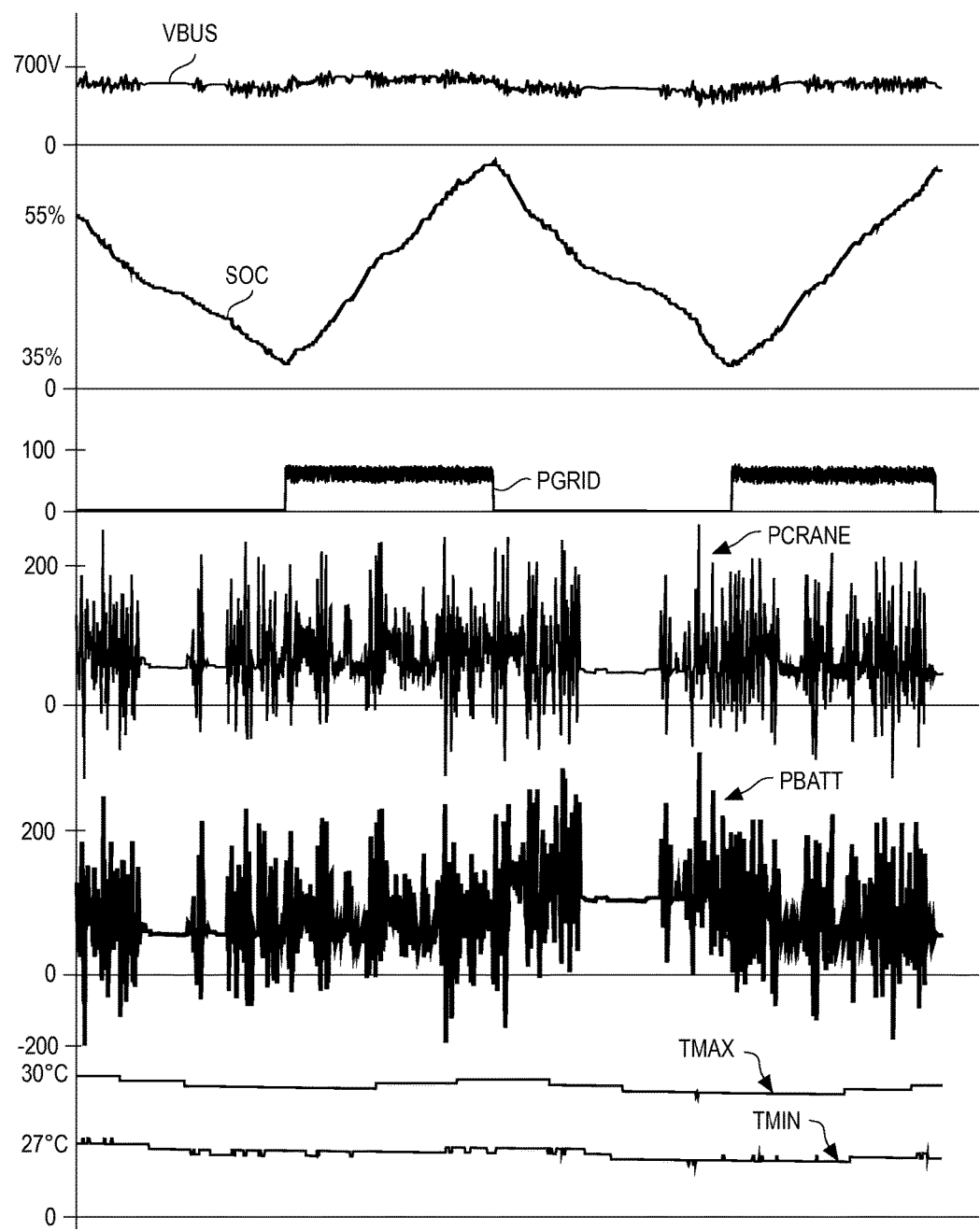
FIG. 3 is a diagram showing energy management of the grid and electric power system.

The waveform diagrams of FIG. 3 illustrate sample operation of the system 10 or 14. A parameter VBUS illustrates a voltage waveform applied to the energy storage device, such as one or more batteries that are maintained in a partially charged state, thereby enabling regenerative energy to be absorbed under most, if not all, operating conditions. For example, the batteries could be maintained in a state of charge (SOC) range between about 35% and about 55% of maximum charge depending on the lift equipment physical characteristics (lift height, crane capacity, etc.) as well as the facility operating requirements. Alternately, the charging energy from the grid could take the form of a lower constant charge rather than an on and off charge and maintain a tighter SOC condition around a nominal value such as 45% SOC. In a still further alternative embodiment, the batteries may be operated in a fully charged state at least some of the time, in which case regenerative power developed during such time might be returned to the grid (if allowable by the utility), dissipated by a resistor or other load, or otherwise used. The grid power PGRID supplied to the energy storage device is intermittent and sufficient to maintain the storage device within the desired SOC range. The crane power and battery power PCRANE and PBATT, respectively, vary with crane motor operation, as should be evident.

Significantly, as also seen in FIG. 3, the battery cells are thermally managed in a narrow range between upper and lower values TMAX and TMIN of about 27 degrees and about 30 degrees Celsius, respectively. This thermal management may be accomplished through careful design of ventilation and cooling equipment and can lead to increased battery life and improved operation.

In the case of the system 14, the system distributes the power among the cranes. The system 10 or 14 can be used on/for any electric crane(s) powered from the grid, e.g., rubber-tired gantry (RTG) crane(s), ship-to-shore crane(s), cantilever crane(s), wide span crane(s), etc.

Figure 4:
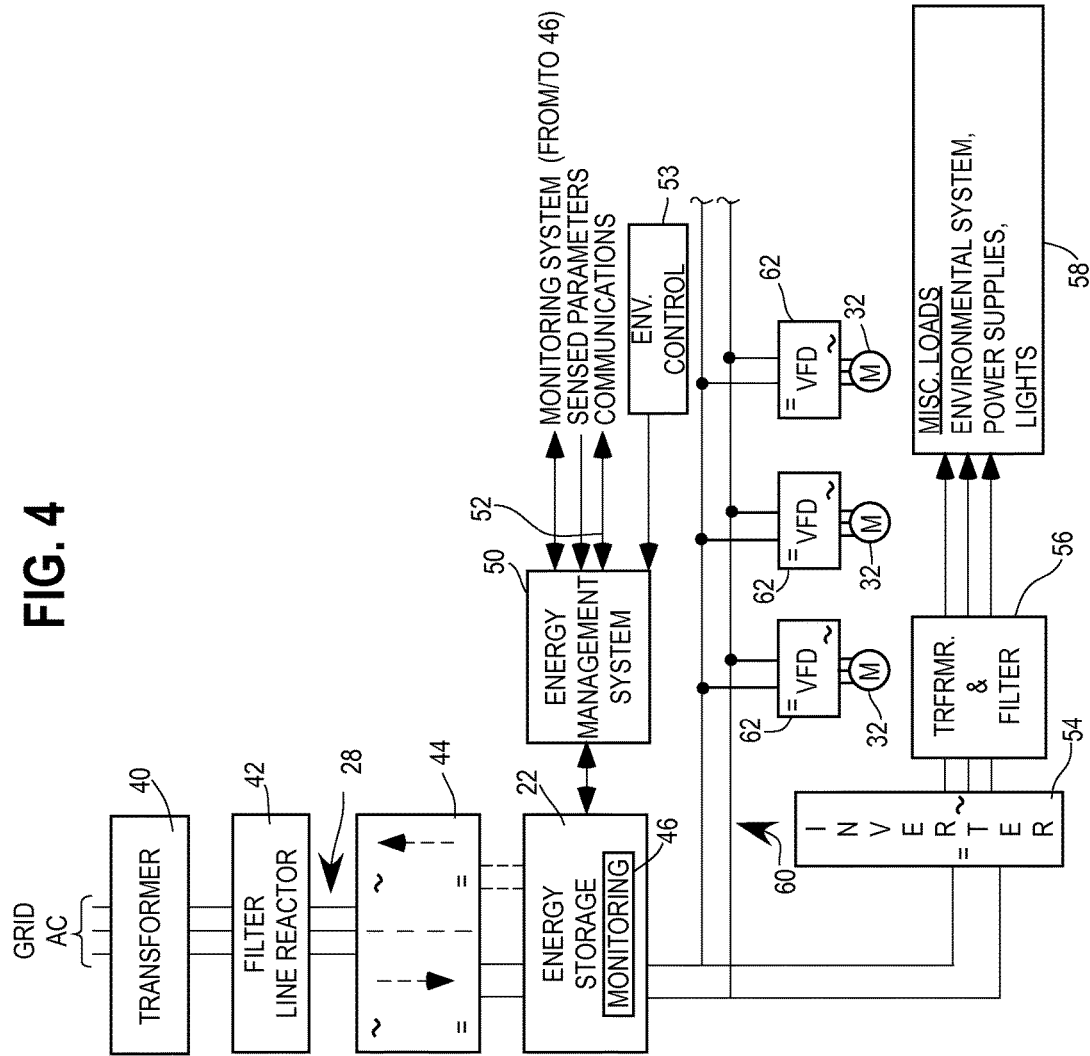
FIGS. 4 and 5 are block diagrams of particular implementations of electric power systems as shown in FIGS. 1 and 2.

Regardless of whether a single crane 12 or multiple cranes 16 are operated by the system 10 or 14, one or more portions of the system 10 or 14 or the entire system 10 or 14 may be disposed on the crane(s) 12 or 16, or one or more portions of the system 10 or 14 may be disposed at one or more locations remote from the crane(s) 12 or 16, or portions may be disposed on and remote from the cranes 12 and/or 16. Thus, for example, FIG. 4 illustrates an embodiment in which components of the system 10 or 14 are disposed on the crane 12 (in the case of the system 10) or multiple cranes 16 (in the case of the system 14) and other components are disposed at a location remote from the crane(s) 12 or 16. Grid power is supplied to an optional transformer 40 and an optional line reactor 42 operating as a filter (the transformer 40 and line reactor 42 are used only if required). An Active Front End (AFE) 44 responds to the AC input power from the grid and rectifies the voltage and current to transfer to the energy storage device 22. Thus, the AFE 44 supplies charging energy to the energy storage device 22, which may also be remote from the crane(s) 12, 16 and located within a container, building or other enclosure. Alternatively, the AFE 44 receives DC power under some regenerative conditions and inverts the voltage and current to transfer to the AC grid, if permitted.

The energy storage device 22 may include a monitoring system 46 for the elements of the energy storage device 22. Cell or elemental temperature, voltage, state of charge, and other data may be monitored. An energy management system 50 is responsive to the monitoring system 46 as well as one or more additional sensed parameters and commands received on a communications link 52 (hard-wired or otherwise) to control the charging and discharging of the energy storage device 22. The monitoring system 46 and/or energy management system 50 includes one or more PLCs or other suitable programmable device(s) to perform diagnostics and take appropriate action through control of the AFE 20 and/or the energy storage device 22 and/or other devices and/or circuits. The energy management system 50 also communicates with the monitoring system 46 and further communicates with other devices over the communications link 52. Further, power may be supplied by the energy storage device 22 and power conversion circuitry such as an inverter 54 and an optional transformer and filter 56 to one or more loads 58, such as environmental component(s) that control the ambient environment of the energy storage device 22, power supplies, lights, etc. Environmental component(s) could take the form of an HVAC system, heaters, fans, sensors, insulation, and/or other devices as necessary or desirable to control the temperature and performance of the energy storage device 22. Some or all of the environmental components may be operated by an environmental control 53 responsive to one or more sensed parameters, such as ambient temperature surrounding the energy storage device 22. The control system 50 and/or the environmental control 53 could include data communication systems, displays, and/or other devices, such as alarms, and other warning and informational components.

DC power from the energy storage device 22 is selectively supplied to one or more DC buses 60 carried by one or more cranes 12 or 16. Each DC bus 60 is coupled to a DC/AC converter (or variable frequency drive (VFD)) 62, which operates a corresponding motor 32. Regenerative power developed by each motor 32 may be returned through the VFD 62 and the DC bus 60 to the charge the energy storage device 22 at those times when the energy storage device is not fully charged. (Regenerative energy developed when the energy storage device 22 is fully charged or when the device 22 is unable to absorb all of the regenerative energy may be dissipated by a resistor or may be otherwise directed to the grid if it is permissible for the grid to receive energy.) As in other embodiments, the peak power rating of the energy storage device 22 is greater than or equal to the peak total power rating of the crane motor(s) 32, all of the total energy demand of the crane motor(s) 32 is provided by the energy storage device 22, and the energy required to charge the energy storage device 22 is supplied by grid energy and energy recovered from regenerative operation of the crane motor(s) 32.

Figure 5:
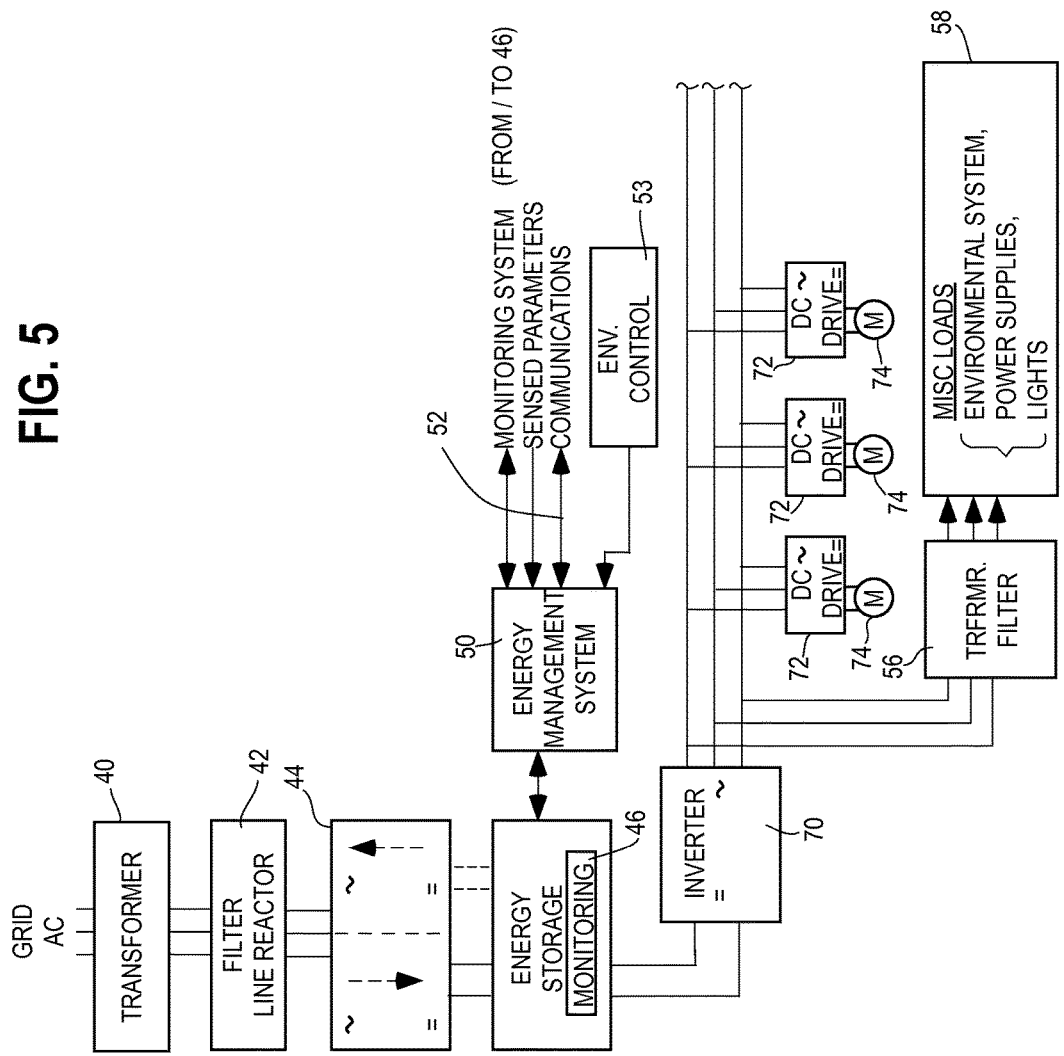

FIG. 5 illustrates an embodiment in which the lifting device is equipped with a DC system (i.e., DC drives and DC motors) and, as a result, this embodiment has some different components as compared to the embodiment of FIG. 4. An added inverter 70 is sized (e.g., larger depending on the lift equipment characteristics) to provide power not only for auxiliary loads 58 but also power for DC drives 72 that operate DC motors 74. It should be noted that any of the circuits and devices shown in FIG. 4 may be included in the system 10 or 14 illustrated in FIG. 5. The transformer 40 and the line reactor 42 may be coupled between grid power and the AFE 44. The AFE 44 may supply charging power from the grid. The AFE 44 may be responsive to grid current as well as one or more additional parameters, as noted in connection with FIG. 4. An optional transformer (not shown) may be coupled between the AFE 44 and each crane motor 74. Some or all of the components of FIG. 5 may be disposed on the crane(s). Again, the peak power rating of the energy storage device 22 is greater than or equal to the peak total power rating of the crane motors 74, all of the total energy demand of the crane motors 74 is provided by the energy storage device 22, and the energy required to charge the energy storage device 22 is supplied by grid energy and energy recovered from regenerative operation of the crane motor(s) 74.

While not shown in the FIGS., a power distribution system having components, such as relays, contactors, fuses, etc. to control power distribution and to protect devices, may be used as necessary and/or desirable. Also, the power distribution system may include the interface connections to the electrical grid, additional transformers, line reactors, AC/DC converters, DC/AC converters, current transformers, and all the elements to connect to the electrical energy, convert and control the electrical energy, and redistribute the energy.

The present embodiments provide the peak energy the load(s) require without drawing the peak energy from the utility. The present embodiments use a low charging power from the grid to keep the energy storage device charged and return any regenerative energy created by the equipment when lowering loads, stopping, etc. to the energy storage device 22 when charging of the device 22 is possible.

INDUSTRIAL APPLICABILITY

In summary, according to one aspect, an electric power system includes an energy storage device having a first peak power rating and an energy transfer circuit operable to provide electric grid energy to the energy storage device and further operable to cause the energy storage device to supply an entire electric demand to at least one electric crane having a second peak power rating no greater than the first peak power rating. The energy storage device absorbs the regenerative energy and provides up to the second peak power rating while being charged by nominal line power.

According to another aspect, an electric power system for a plurality of electric cranes includes an energy storage device having a first peak power rating wherein the plurality of electric cranes have a combined second peak power rating less than the first peak power rating and each being capable of developing regenerative energy. The electric power system further includes an energy transfer circuit that provides electric grid energy and the regenerative energy to the energy storage device to charge the energy storage element and further providing operating power for the plurality of electric cranes throughout an entire operational range of each electric crane. Such an energy storage device for multiple cranes is appropriately sized to handle the total energy requirement of all the cranes. As in the previous aspect, the energy storage device absorbs the regenerative energy and provides the peak power while being charged by nominal line power. The system inherently redistributes power to all the cranes and minimizes any regenerative energy going to the resistor. The system could be mounted in a custom enclosure or container.

In any embodiment, the electric power system minimizes peak demand from the grid and utilizes only low level power. The electric power system is adaptable to all electric cranes ordinarily powered by the grid and can connect to the crane dc bus or crane ac interface depending in the crane configuration.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

I claim:

1. An electric power system for a plurality of electric cranes, comprising:
   a single energy storage device having a first peak power rating; and
   an energy transfer circuit operable to provide electric grid energy to the energy storage device and further operable to cause the energy storage device to supply an entire electric demand to the plurality of electric cranes that together have a second peak power rating no greater than the first peak power rating.

2. The electric power system of claim 1, wherein the energy transfer circuit is further operable to transfer regenerative power to the energy storage device.

3. The electric power system of claim 1, wherein the energy storage device is disposed on at least one of the plurality of cranes.

4. The electric power system of claim 1, wherein the energy storage device is disposed remote from the plurality of electric cranes.

5. The electric power system of claim 1, in combination with a grid power supply system.

6. The electric power system of claim 1, wherein the energy transfer circuit includes a sensor for sensing energy delivered to the energy storage device and the energy transfer circuit comprises an active front end.

7. The electric power system of claim 1, wherein the energy storage device comprises a battery.

8. The electric power system of claim 1, wherein the energy storage device comprises a capacitor system.

9. The electric power system of claim 1, wherein the energy storage device comprises a combined battery/capacitor system.

10. The electric power system of claim 3, wherein the energy transfer circuit includes an AC/DC converter disposed on at least one of the plurality of cranes for converting grid power into DC power for charging the energy storage device.

11. An electric power system for an electric crane, comprising:
a single energy storage device having a first peak power rating;
the electric crane having a second peak power rating less than the first peak power rating and capable of developing regenerative energy; and
an energy transfer circuit that provides electric grid energy and the regenerative energy to the energy storage device to charge the energy storage device and further provides operating power from the energy storage device exclusively to meet an entire electrical demand for the electric crane throughout an entire operational range of the electric crane.

12. The electric power system of claim 11, wherein the energy storage device is disposed on the electric crane.

13. The electric power system of claim 11, wherein the energy transfer circuit includes a sensor for sensing energy delivered to the energy storage device and the energy transfer circuit comprises an active front end.

14. The electric power system of claim 11, wherein the energy storage device comprises a battery.

15. The electric power system of claim 11, wherein the energy storage device comprises a capacitor system.

16. The electric power system of claim 11, wherein the energy storage device comprises a combined battery/capacitor system.

17. The electric power system of claim 11, wherein the energy transfer circuit includes an AC/DC converter disposed on the electric crane for converting grid power into DC power for charging the energy storage device.

18. An electric power system for a plurality of electric cranes, comprising:
a single energy storage device having a first peak power rating;
the plurality of electric cranes having a combined second peak power rating less than the first peak power rating and each being capable of developing regenerative energy; and
an energy transfer circuit that provides electric grid energy and the regenerative energy to the energy storage device to charge the energy storage device and further providing operating power from the energy storage device to meet an entire electrical demand for the plurality of electric cranes throughout an entire operational range of each electric crane.

19. The electric power system of claim 18, wherein the energy storage device is disposed remote from the plurality of electric cranes.

20. The electric power system of claim 18, wherein the energy storage device comprises a battery.

21. The electric power system of claim 18, wherein the energy storage device comprises a capacitor system.

22. The electric power system of claim 18, wherein the energy storage device comprises a combined battery/capacitor system.

* * * * *